March 8, 1949.  B. R. DICKS  2,464,077
MULTIPLE PULLEY MOUNT
Filed Nov. 23, 1944
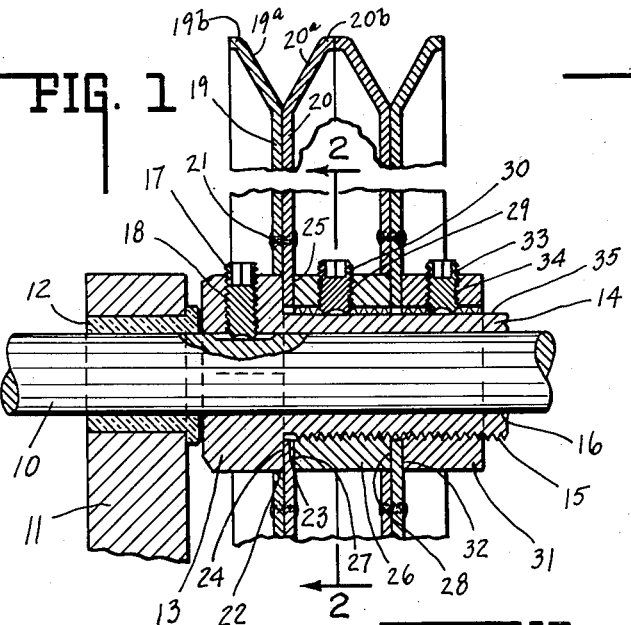
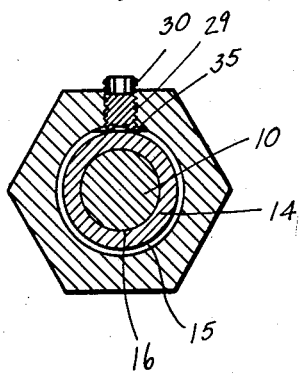
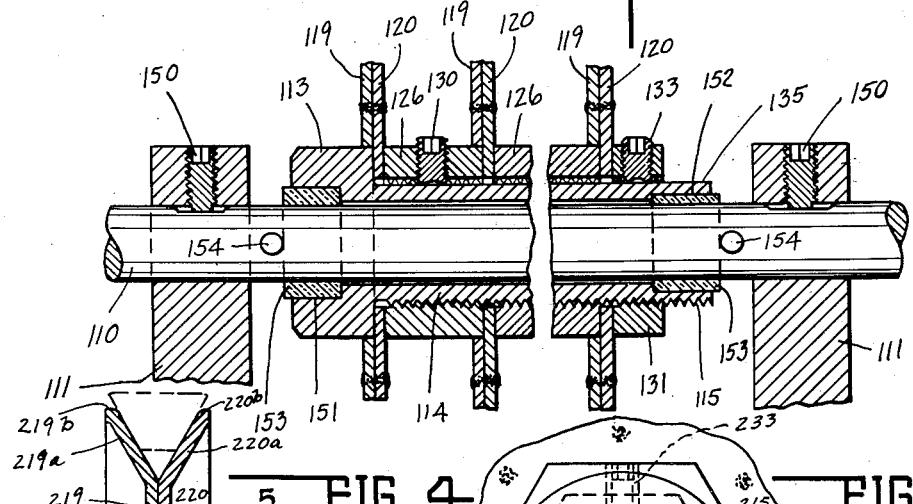
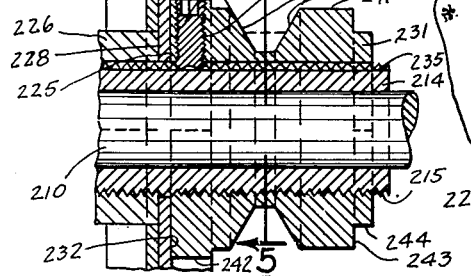
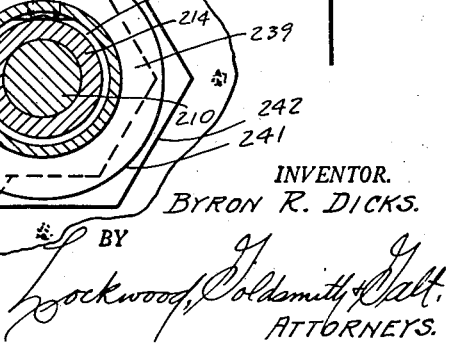
INVENTOR.
BYRON R. DICKS.
BY
Lockwood, Goldsmith & Galt
ATTORNEYS.

Patented Mar. 8, 1949

2,464,077

UNITED STATES PATENT OFFICE 2,464,077

MULTIPLE PULLEY MOUNT

Byron R. Dicks, Indianapolis, Ind.

Application November 23, 1944, Serial No. 564,835

18 Claims. (Cl. 74—230.3)

This invention relates to a multiple sheave pulley structure.

One chief object of this invention is to provide a driving or like mounting for a plurality of sheave wheels so that several sheaves are unitized together for unitary operation.

Another chief object of this invention is to provide a loose pulley structure having a plurality of sheave wheels.

The chief feature of this invention resides in providing an elongated hub upon which the several sheaves are mounted in relatively spaced relation and are rigidized with the hub so that relative rotation therebetween is prevented and the several sheaves are successively clamped together by interposed nuts, all as hereinafter more fully recited.

Other objects and features of the invention will be set forth more fully hereinafter.

The full nature of the invention will be understood from the accompanying drawings and the following description and claims:

In Fig. 1 of the drawings there is illustrated in central section a shaft, elongated hub, a plurality of sheave wheels and clamping and spacing nuts embodying the invention.

Fig. 2 is a transverse section taken on line 2—2 of Fig. 1 and in the direction of the arrows.

Fig. 3 is a view similar to Fig. 1 and of a loose pulley embodiment of the invention.

Fig. 4 is a view similar to Figs. 1 and 3 and of a still further modified form of the invention.

Fig. 5 is a transverse section taken on line 5—5 of Fig. 4 and in the direction of the arrows.

In Figs. 1 and 2 of the drawings, 10 indicates a driving or driven shaft, as desired, supported by way of illustration in bearing 11, bushed as at 12. An elongated hub has a head portion 13 preferably with a polygonal periphery and an internal tubular body portion 14 that is externally threaded as at 15. Bore 16 extends through the hub and the latter is mounted on shaft 10, being secured thereto by set screw 17 extending radially and threading through the head as at 18.

Each sheave wheel herein is illustrated by way of example only as comprised of two plates 19 and 20 suitably secured together as at 21 by spot welding and the like. The outer peripheries have diverging portions 19a and 20a, each with an outwardly directed rim 19b and 20b. The structure forms a groove to take or accommodate a V-belt.

Plate 19 herein has a central opening therethrough, the wall of which is polygonal as at 22 and same can be telescoped on head 13 periphery, so that relative rotation therebetween is prevented. Plate 20 has a smaller central opening 23 therethrough coaxial with opening 22 and through which extends the body portion 14 of the hub. Plate 20 provides bearing faces 24 and 25. No claim is made to this pulley wheel, for it is of long commercial standing. By the same token other wheels having similar or equivalent central mounting formations may be utilized in lieu of the wheels shown herein.

A spacing and so-called driving nut 26 has a periphery like that of head 13, at least at its end remote from clamping face 27. At the opposite end is a bearing face 28. Extending radially and threaded through this nut as at 29 is a set screw 30.

When the head engaging wheel socket seats the head and nut 26 is screwed up on body portion 14, the sheave wheel is clamped to the hub for driving by shaft 10 or conversely.

As illustrated in Fig. 1, a plurality of wheels are provided on a single elongated hub. The length of the nut 26 is at least sufficient to at least just space the adjacent wheels so no strain is imposed between adjacent rims 19b and 20b of adjacent wheels. This prevents groove distortion.

The second wheel socket seats the said remote polygonal end of nut 26. The length of the hub determines the maximum number of wheels mountable thereon. There is provided an end nut 31 with clamping face 32 and set screw 33 extending radially and threaded through the nut at 34 into hub engagement to lock up the assembly. This set screw is preferred because the direction of unit rotation may be such as to attempt unthreading of nut 31.

Herein also, to insure non-mutilation of the thread 15 of the hub 14 by set screws 30 and 33 the hub is "flatted" as at 35 and this may be of thread depth. Accordingly, it may be of body length and of appreciable width. Since the wheel widths at the centers may slightly vary in thickness, this width of face insures set screw contact despite slight differences in actual rotative positions of the several nuts when in sheave clamping relation.

It is contemplated that the wheel may be of the same or different groove diameters and two or more wheels may be simultaneously secured on the single hub, there being one less spacing nut than there are wheels in each instance, excluding the end nut, which may or may not be of spacing nut character.

Reference will now be had to Fig. 3 wherein a so-called loose pulley embodiment of the invention is illustrated. Herein numerals of the one hundred series indicate parts identical or similar to parts illustrated in Figs. 1 and 2 and indicated by corresponding numerals of the primary series.

Major differences in these embodiments are as follows: Standards or bearings rigidly support shaft 110, same being prevented from axial movement by set screws 150 and the like. The elongated hub herein has its head exposed end counterbored at 151 and its threaded opposite end is also counterbored at 152. In each is seated a thrust, and if desired, anti-friction bearing 153 and adjacent pins 154 through the shaft 110 localize this loose pulley structure thereon. Herein the hub head 113 is, naturally, not provided with a set screw similar to set screw 17. All other parts are the same as illustrated in Figs. 1 and 2.

Whenever desired the hub may be counterbored at each end, as well as radially tapped and threaded as at 16, so that any hub can serve as illustrated in Fig. 1, or as illustrated in Fig. 3.

Whenever the structure shown is to be used with multiple belts and set screw 17 is insufficient in holding power, obviously the shaft 10 and hub portion may be suitably keyed together in a conventional manner.

Whenever the structure is intended for use as a speed change device, the pulleys will vary in diameter and be stepped in size. Associated therewith will be a reversely stepped multiple pulley structure. With the two hubs at fixed center distances and proper stepping between pulleys and selection of diameters, a single belt can be shifted from one aligned pair of pulleys on the parallel hubs to another pair of aligned pulleys and thereby obtain a speed change.

Also when one power shaft is to drive two machines at different speeds, the multiple pulley structure may have driving pulleys of the same or different diameter, while the driven pulleys of the machines may have different or the same diameter pulleys, respectively, there being at least one belt for each machine to be driven.

Also, if desired, one or more of such driven machines may have a variable speed connection between it and the power shaft in the manner previously described.

The foregoing constitutes only a few examples of the use of the present invention.

Whenever the overall width of the belt exceeds the maximum thickness of the pulley or pulleys the length of spacing nut 26 or 126 must at least be sufficient to provide clearance between adjacent belts if two or more are used simultaneously.

At present V-belts are made in several standard widths, wherefore the nuts 26 or 126 have a length at least sufficient to space apart the widest belts and pulleys when running on adjacent pulleys.

In Figs. 4 and 5 there is illustrated a modified form of the invention, same being illustrated as an end or retaining nut. However, it may be interposed between adjacent pulleys and thus provide an intermediate belt drive, etc., of minimum diameter.

In said figures numerals of the two hundred series designate parts identical or similar to those illustrated in Figs. 1 and 2 and designated by the primary numerals.

In Figs. 4 and 5 the shaft 210 supports the hub having portion 214 externally threaded at 215 and flatted at 235. Pulley wheel 219—220 has a socket seating the nut 226. Nut 231 is elongated and has face 232 bearing against the wheel for clamping same. It has a polygonal periphery 242 for tool engagement.

This portion is radially tapped as at 234 for set screw 233. The intermediate portion of the nut may be cylindrical and have a V-groove 240 therein to take a V-belt as shown dotted in Fig. 4. Said groove is spaced from face or end 232 a sufficient distance so that this belt clears the belt and/or pulley adjacent the nut 231.

The other end of the nut 231 may be reduced and formed like the socket seating end of nut 226. This is shown at 244. The V-groove in this instance is equidistant from the ends 243 and 232 of said nut.

Herein, however, the nut is shown as an end or locking up nut, but it may be used as a dual spacer between dual spaced pulleys, thereby providing a V-groove of minimum diameter for belt seating purposes.

Of course, if this nut is used as an end nut it can be reversely mounted on the hub whereupon set screw 233 is at the end of the assembly as in Fig. 1.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a multiple pulley structure having a plurality of pulley sheaves, each of appreciable width and having a peripheral groove and an inner plate with a central opening therein, which is laterally enlarged at one end to provide a shoulder and adjacent bearing face at that end and a bearing face at the opposite end, a hub having an enlarged end, a portion of which is seatable in the opening enlargement in a plate and having a driving portion engaging the shoulder thereof, and a clamping face, said hub having an elongated threaded extension projectable through a plurality of sheaves, clamping means on the threaded portion, and driving nut means interposed between the sheaves, there being as many nuts, less one, as there are sheaves, each driving nut having opposite ends arranged for clamping engagement and a driving shoulder.

2. Structure as defined by claim 1 characterized by set screw means extending through each nut for hub engagement.

3. Structure as defined by claim 1 characterized by set screw means extending through each nut for hub engagement, the threaded portion of the hub having a flat face for set screw engagement.

4. In a multiple pulley structure comprising a plurality of pulleys, each having a central opening therethrough and laterally enlarged to provide a recess with a non-circular peripheral wall and a back wall at one side thereof, the combination of a centrally bored member simultaneously seatable in and projecting through all pulley openings, means rigid with one end of the member and having a peripheral wall seatable in the recess and engaging the non-circular wall thereof for relative non-rotation therebetween and having a clamping face operatively bearing on the back wall, the opening projecting portion of the member being peripherally threaded, a nut threadable thereon and having a face for clamping the first pulley against said means face, said nut on the end opposite the first pulley clamping face having a peripheral wall seatable in the recess of the second pulley and interengaging with the wall thereof and having an opposite face engaging the back wall of the second pulley recess, the nut having a length at least sufficient to at least space the pulley peripheries, there being as many spacing nuts, less one, as there are pulleys, and nut means on the threaded projection portion and bearing against the last pulley for retention thereof on said member.

5. In a multiple pulley structure comprising a plurality of pulleys, each having a central opening therethrough and laterally enlarged to provide a recess with a non-circular peripheral wall and a back wall at one side thereof, the combination of a centrally bored member simultaneously seatable in and projecting through all pulley openings, means rigid with one end of the member and having a peripheral wall seatable in the recess and engaging the non-circular wall thereof for relative non-rotation therebetween having a clamping face operatively bearing on the back wall, the opening projecting portion of the member being peripherally threaded, a nut threadable thereon and having a face for clamping the first pulley against said means face, said nut on the end opposite the first pulley clamping face having a peripheral wall seatable in the recess of the second pulley and interengaging with the wall thereof and having an opposite face engaging the back wall of the second pulley recess, the nut having a length at least sufficient to at least space the pulley peripheries, there being as many spacing nuts, less one, as there are pulleys, nut means on the threaded projection portion and bearing against the last pulley for retention thereof on said member, and set screw means for the last mentioned nut means for locking same to the threaded member.

6. Structure as defined by claim 4 wherein the spacing nut is provided with a set screw and the threaded member has a non-threaded portion for set screw engagement.

7. Structure as defined by claim 5 wherein the spacing nut is provided with a set screw and the threaded member has a non-threaded portion for set screw engagement.

8. Structure as defined by claim 1 wherein the elongated hub is tubular and the shaft means is positioned in the tubularity, and means is provided to prevent displacement of the hub and shaft means.

9. Structure as defined by claim 1 wherein the elongated hub is tubular and shaft means is positioned in the tubularity, and means is provided to prevent displacement of the hub and shaft means comprising a set screw extending through the enlarged end and to the shaft means.

10. Structure as defined by claim 1 wherein the elongated hub is tubular and shaft means is positioned in the tubularity, and means is provided to prevent displacement of the hub and shaft means comprising bearings at each end of the hub and said shaft means is provided with a stop adjacent each bearing.

11. Structure as defined by claim 4 wherein shaft means projects through the member bore and means is provided to prevent displacement between the member and the shaft means.

12. Structure as defined by claim 4 wherein shaft means projects through the member bore and means is provided to prevent displacement between the member and the shaft means comprising a set screw extending through the first mentioned means and to the shaft means.

13. Structure as defined by claim 4 wherein shaft means projects through the member bore and means is provided to prevent displacement between the member and the shaft means comprising bearings at each end of the member, the latter being counterbored to seat said bearings and a stop on the shaft means adjacent each bearing for the purpose described.

14. A nut for clamping a pulley threaded upon a hub, the nut comprising a body having a longitudinally directed centrally disposed internally threaded bore therethrough, the body having an end adapted for pulley engagement, the body having a cylindrical exterior portion with a belt seating groove therein spaced from the body ends and sufficiently spaced from the pulley clamping end for multiple belt clearance, said body having an exterior tool engageable peripheral portion adjacent one of the ends.

15. A nut for clamping a pulley threaded upon a hub, the nut including a belt seating groove in its periphery spaced from the ends of that nut and sufficiently spaced from the pulley clamping end for multiple belt clearance, one end of said nut having a non-circular pulley socket seating end of sufficient length for seating in a pulley socket of another pulley and for record pulley driving purposes.

16. A nut for clamping a centrally socketed pulley upon a hub, said nut including a belt seating groove in its periphery and having at least one end adapted for clamping a pulley and the other end for seating in a pulley socket of a second pulley for driving that pulley, the groove being sufficiently spaced from the opposite ends of the nut for belt clearance between belts on the pulleys and in the groove.

17. A nut as defined by claim 16 wherein set screw means extends substantially radially through the nut to the inside of same for hub anchorage.

18. A nut structure comprising an intermediate pulley portion internally tapped and a nut portion adjacent each side of the pulley portion and similarly tapped, and a tubular hub with threaded exterior for portion threading thereon and a head, the nut structure being longitudinally adjustable on the hub by relative rotation therebetween.

BYRON R. DICKS.

REFERENCES CITED

The following references are of record in the file of this patent:

UNITED STATES PATENTS

| Number | Name | Date |
|---|---|---|
| Re. 16,594 | Reiland et al. | Apr. 19, 1927 |
| 134,649 | Delfer | Jan. 7, 1873 |
| 196,085 | Haigh | Oct. 16, 1877 |
| 215,345 | Forbes | May 13, 1879 |
| 917,450 | Jones et al. | Apr. 6, 1909 |
| 2,253,612 | Dow | Aug. 26, 1941 |
| 2,340,549 | Miller | Feb. 1, 1944 |